US011840634B2

(12) United States Patent
Cross et al.

(10) Patent No.: US 11,840,634 B2
(45) Date of Patent: Dec. 12, 2023

(54) STRETCHABLE ELECTRICALLY CONDUCTIVE INK COMPOSITIONS

(71) Applicants: Henkel IP & Holding GmbH, Duesseldorf (DE); Henkel AG & Co. KGaA, Duesseldorf (DE)

(72) Inventors: Robert P. Cross, Rocky Hill, CT (US); Bahram Issari, Glastonbury, CT (US); Wenhua Zhang, Farmington, CT (US); Lynnette M. Hurlburt, Manchester, CT (US); Jiangbo Ouyang, Wallingford, CT (US); Rudolf Oldenzijl, Hoogezand (NL); Inge van der Meulen, WM Eersel (NL)

(73) Assignee: HENKEL AG & CO, KGaA, Duesseldorf (DE)

( * ) Notice: Subject to any disclaimer, the term of this patent is extended or adjusted under 35 U.S.C. 154(b) by 87 days.

(21) Appl. No.: 17/360,033

(22) Filed: Jun. 28, 2021

(65) Prior Publication Data
US 2021/0324219 A1      Oct. 21, 2021

Related U.S. Application Data

(63) Continuation of application No. PCT/US2019/067102, filed on Dec. 18, 2019.
(Continued)

(51) Int. Cl.
*C09D 11/52*      (2014.01)
*C08K 3/08*      (2006.01)
*C08K 7/00*      (2006.01)
*C09D 11/033*      (2014.01)
*C09D 11/102*      (2014.01)

(52) U.S. Cl.
CPC ............... *C09D 11/52* (2013.01); *C08K 3/08* (2013.01); *C08K 7/00* (2013.01); *C09D 11/033* (2013.01); *C09D 11/102* (2013.01); *C08K 2003/0806* (2013.01); *C08K 2201/001* (2013.01)

(58) Field of Classification Search
CPC ...................................... C09D 11/52
See application file for complete search history.

(56) References Cited

U.S. PATENT DOCUMENTS 3,989,644 A     11/1976 Bolon et al.
5,174,925 A     12/1992 Fujii et al.
(Continued)

FOREIGN PATENT DOCUMENTS

CN     107001686        8/2017
CN     107337964 A     11/2017
(Continued)

OTHER PUBLICATIONS

International Search Report for PCT/US2019/067102 dated Apr. 16, 2020.
(Continued)

*Primary Examiner* — Khanh T Nguyen
(74) *Attorney, Agent, or Firm* — Sun Hee Lehmann

(57) ABSTRACT

Provided herein are stretchable conductive inks consisting of a continuous polymer phase with dispersed silver flakes and a low melting metal or alloy, wherein initial resistivity is measured before elongation and the resistivity of the stretchable conductive ink composition is less than 10 times the initial resistivity at 50% elongation.

18 Claims, 3 Drawing Sheets

Related U.S. Application Data

(60) Provisional application No. 62/794,167, filed on Jan. 18, 2019.

(56) References Cited

U.S. PATENT DOCUMENTS

| | | | |
|---|---|---|---|
| 2003/0151028 A1* | 8/2003 | Lawrence | H05K 1/095 |
| | | | 252/500 |
| 2009/0173919 A1 | 7/2009 | Webster et al. | |
| 2016/0130471 A1 | 5/2016 | Burrows et al. | |
| 2018/0148584 A1* | 5/2018 | Chu | C09D 7/69 |
| 2021/0016541 A1 | 1/2021 | Tosaki et al. | |

FOREIGN PATENT DOCUMENTS

| | | | |
|---|---|---|---|
| CN | 107573745 A | | 1/2018 |
| CN | 108384327 A | * 8/2018 | C09D 11/03 |
| CN | 108384327 A | | 8/2018 |
| JP | 2015079724 A | | 4/2015 |
| JP | 2018198133 A | | 12/2018 |
| JP | 2019143094 A | | 8/2019 |
| JP | 2019189680 A | | 10/2019 |
| WO | 2014204265 A1 | | 12/2014 |
| WO | 2016073465 A1 | | 5/2016 |
| WO | 2018194517 A1 | | 10/2018 |

OTHER PUBLICATIONS

Wang J, Cai G, Li S, Gao D, Xiong J, Lee PS. Printable superelastic conductors with extreme stretchability and robust cycling endurance enabled by liquid-metal particles. Advanced Materials. Apr. 2018;30(16):1706157.

Zhang Dongxing et al., Polymer Matrix Composites Science and Engineering, p. 371, Harbin Institute of Technology Press, Jul. 2018.

* cited by examiner

STRETCHABLE ELECTRICALLY CONDUCTIVE INK COMPOSITIONS

BACKGROUND OF THE INVENTION

New commercial applications requiring printed conductive materials are continuously arising in the electronics industry. Some of these commercial applications are printed antennas for radio frequency identification ("RFID") tags, printed transistors, solar cells, in-mold electronics and wearable electronics. These printed conductive materials are typically produced by printing a conductive ink using a specific printing process.

Conductive inks are typically particle-based, based on conductive particles, which are typically synthesized separately and then incorporated into the ink formulation. Conductive inks typically consist of a continuous polyurethane phase with conductive flakes dispersed therein. The properties of the resulting conductive ink are then tuned for a specific printing process and end use. Typically, the printing processes require a specific viscosity to allow for printing of the composition. A conductive ink can selectively be applied to desired substrates by one of these specific printing processes.

Stretchable conductive inks, specifically, are in demand in two major areas: 1) in-mold applications, which includes panels for appliances, dashboards and buttons for automotive and aerospace applications, and interfaces for industry controls and 2) wearable applications, which include but are not limited to textile applications and wearable medical devices. The usefulness of existing conductive inks for in-mold and wearable applications is limited because the conductivity of the inks is lost at relatively low elongation i.e., the inks are not stretchable.

Commercially available conductive particles include silver flakes that are commonly surface modified with fatty acids such as stearic or oleic acid to enable milling and keep from cold welding during storage. This surface treatment, however, does not improve stretch or conductivity of the composition and is useful only for dispersing the powder in the matrix.

The conductivity of the conductive ink compositions depends on contact between the conductive fillers to form continuous conductive paths. Maintaining these continuous paths while stretching the conductive ink compositions is challenging.

Accordingly, there remains a need for stretchable conductive inks that maintain conductivity after stretch and have higher elongation to electrical and mechanical failure.

SUMMARY OF THE INVENTION

Disclosed herein are stretchable conductive ink compositions comprising: a binder, conductive particles; and a low melting metal or alloy. The binder is a polymer, a reactive monomer with initiator, an oligomer, or a combination thereof. The resistivity of the stretchable conductive ink composition is less than 10 times the initial resistivity at 50% elongation.

DETAILED DESCRIPTION OF THE INVENTION

Figure 1:
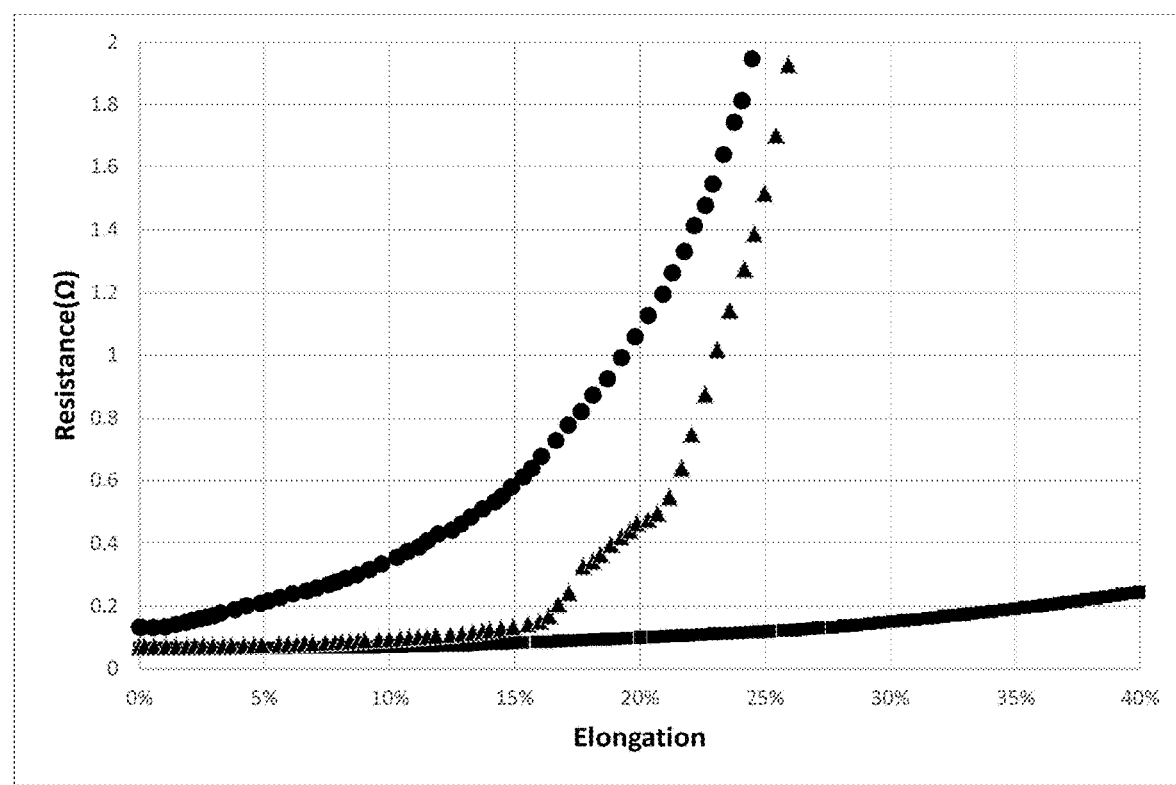
FIG. 1 depicts a plot of resistance (Ohm) versus elongation percentage for Control example A including gallium when heated above the melting point of gallium.

The conductive ink compositions disclosed herein surprisingly enhance stretchability by maintaining the conductivity of the composition when stretched by including a low melting metal or alloy that maintains the contact between the conductive flakes included in the composition. Specifically, the stretchable conductive ink compositions disclosed herein comprise a polymer, a reactive monomer, oligomer, or a combination thereof; conductive flakes; and a low melting metal or alloy. The stretchable conductive ink compositions disclosed herein comprise a three phase system liquid metal or alloy in a polymer matrix with solid conductive filler dispersed therein. The resistivity of the stretchable conductive ink compositions is less than 10 times the initial resistivity at 50% elongation.

Conductive Particles

The conductive particles used herein can be chosen from a variety of conductive particles known in the art. The conductive particles can be thermally conductive, electrically conductive, thermally insulating, electrically insulating, or various combinations thereof. In a preferred embodiment, the conductive particle is electrically conductive flake.

The conductive particle remains a discrete phase within the polymer matrix of the composition.

Exemplary conductive fillers include, but are not limited to, silver, copper, gold, palladium, platinum, nickel, gold or silver-coated nickel, carbon black, carbon fiber, graphite, aluminum, indium tin oxide, silver coated copper, silver coated aluminum, metallic coated glass spheres, metallic coated filler, metallic coated polymers, silver coated fiber, silver coated spheres, antimony doped tin oxide, conductive nanospheres, nano silver, nano aluminum, nano copper, nano nickel, carbon nanotubes and mixtures thereof. The conductive flake can be made of a metal or carbon. Preferably, the conductive flake is a silver, aluminum, carbon, nickel, copper, graphite flake, or a combination thereof. More preferably, the conductive flake is a silver flake. In one embodiment the conductive flake is a mixture of different size silver flakes, such as a mixture of SF-80, commercially available from Ferro, and SF-AA0101, commercially available from Metalor.

Any shape and size of the particle is contemplated. The conductive particles can be flakes, for example the flakes can be in the geometric form of flake, dendritic, or needle type filler flakes. The conductive particles can also be spherical, cubical or an irregular shape. The conductive particles can also be a combination of conductive fillers with different geometry, for example a combination of flake and spherical particles.

The conductive particles will make the ink have a higher viscosity when cured composition harder and therefore less stretchable. An increased conductive particle loading, however, will also increase the conductivity of the composition. Accordingly, it is necessary to balance these two factors when determining the appropriate amount of conductive particles to include in the composition. Preferably, the conductive particle is present in the composition in an amount of about 20% to about 90% by volume, for example about 30% to about 70% by volume, for example about 40 to about 60% by volume of the entire composition.

Conductive Beads

The compositions disclosed herein can optionally further comprise conductive beads. The conductive beads allow the conductive flake to move relative to each other while maintaining the conductive pathway throughout the ink composition.

Further, when the randomness of the orientation of the conductive fillers is increased by the inclusion of the conductive beads, the contact efficiency of the conductive fillers is improved. Combining non-spherical conductive fillers with an aspect ratio outside of about 0.9 to about 1.1 with low aspect ratio spherical beads (aspect ratio of about 0.9 to about 1.1) can help increase this randomness of the orientation of the conductive fillers, thereby increasing the contact efficiency of the conductive fillers. The size ratio of the beads to the flake can also be optimized in order to increase the randomness of the filler orientation.

The beads are conductive and can also be made of silver, copper, gold, palladium, platinum, nickel, gold or silver-coated nickel, carbon black, carbon fiber, graphite, aluminum, indium tin oxide, silver coated copper, silver coated aluminum, metallic coated glass spheres, metallic coated filler, metallic coated polymers, silver coated fiber, silver coated spheres, antimony doped tin oxide, conductive nanospheres, nano silver, nano aluminum, nano copper, nano nickel. The beads can be made of the same material as the conductive flake or a different conductive material.

The conductive beads included in the compositions disclosed herein can have an aspect ratio from 0.9 to 1 and a diameter of less than 1 μm.

Further, the size ratio size ratio of the diameter of the beads to the size of the flake can be in the range of about 0.5 to about 2.0, for example about 0.85 to about 1.15.

Even further, the volume ratio of conductive flake to conductive bead included in the composition is in the range of about 98:2 to about 55:95, preferably about 70:30 by volume.

Polymers

Useful polymers for the conductive ink compositions disclosed herein are limited by the printing method and end use of the compositions. The polymer can be selected based on the desired properties of the composition such as, for example, cure temperature, cure time, viscosity, and hardness. The polymers used herein can be, for example, thermoplastic polymers, thermosetting polymers, and elastomers.

Useful thermoplastic polymers, include but are not limited to: polyacrylate, ABS, Nylon, PLA, polybenzimidazole, polycarbonate, polyether sulfone, polyoxymethylene, polyetherether ketone, polyetherimide, polyethylene, polyphenylene oxide, polyphenylene sulfide, polypropylene, polystyrene, polyvinyl chloride, Teflon;

Useful thermosetting polymers include but are not limited to: polyester, polyurethanes, polyurea/polyurethane, vulcanized rubber, bakelite, phenol-formaldehyde, duroplast, urea-formaldehyde, melamine, diallyl-phthalate (DAP), epoxy, epoxy novolac, benzoxazines, polyimides, bismaleimides, cyanate esters, polycyanurates, furan, silicone, thiolyte, vinyl ester.

Useful elastomers include but are not limited to: unsaturated rubbers, such as: polyisoprene, polybuadiene, chloroprene, polychloroprene, neoprene, baypren, butyl rubber, halogenated butyl rubbers, styrene-butadiene, hydrogenated nitrile, therban, zetpol; saturated rubbers, such as: ethylene propylene (EPM), ethylene propylene diene (EPDM, epichlorohydrin (ECO), polyacrlic rubber (ACM, ABR), silicone rubber, flurorosilicone rubber, fluroroelastomers viton, tecnoflon, fluorel, aflas, Dai-El, perfluoroelastomers, tecnoflon PFR, Kalrez, Chemaz, Perlast, Polyether block amides (PEBA), chlorosulfonated polyethlene (CSM), Hypalon, ethylene-vinyl acetated (EVA); Other 4S elastomers, such as: thermoplasitic elastomers (TPE), the proteins resilin and elastin, polysulfide rubber, elastolefin, elastic fiber.

Preferably, thermal plastic urethane (TPU) is used as the polymer.

Specifically, for example, ESTANE® 5715, ESTANE® 5703 (manufactured by Lubrizol) are useful in the compositions disclosed herein. Vinyl chloride copolymer is also useful, for example VINNOL® E15/48A (manufactured by Wacker Chemie AG).

Oligomers

Useful oligomers, including but not limited to: oligomers of polyacrylate, ABS, Nylon, PLA, polybenzimidazole, polycarbonate, polyether sulfone, polyoxymethylene, polyetherether ketone, polyetherimide, polyethylene, polyphenylene oxide, polyphenylene sulfide, polypropylene, polystyrene, polyvinyl chloride, Teflon, polyester, polyurethanes, polyurea/polyurethane, unsaturated rubbers, such as: polyisoprene, polybuadiene, chloroprene, polychloroprene, neoprene, baypren, butyl rubber, halogenated butyl rubbers, styrene-butadiene, hydrogenated nitrile, therban, zetpol; saturated rubbers, such as: ethylene propylene (EPM), ethylene propylene diene (EPDM, epichlorohydrin (ECO), polyacrlic rubber (ACM, ABR), silicone rubber, flurorosilicone rubber, fluroroelastomers viton, tecnoflon, fluorel, aflas, Dai-El, perfluoroelastomers, tecnoflon PFR, Kalrez, Chemaz, Perlast, Polyether block amides (PEBA), chlorosulfonated polyethlene (CSM), Hypalon, ethylene-vinyl acetated (EVA); Other 4S elastomers, such as: thermoplasitic elastomers (TPE), the proteins resilin and elastin, polysulfide rubber, elastolefin, and elastic fibers.

Reactive Monomers

Useful reactive monomers can include epoxy monomers, acrylic monomers, and (meth)acrylate. Specific examples of suitable monomers include methyl methacrylate, methyl acrylate, butyl methacrylate, t-butyl methacrylate, 2-ethylhexyacrylate, 2-ethylhexylmethacrylate, ethyl acrylate, isobornyl methacrylate, isobornyl acrylate, 2-hydroxyethyl methacrylate, glycidyl methacrylate, tetrahydrofurfuryl methacrylate, acrylamide, n-methyl acrylamide. Further examples include acrylate or methacrylate containing monomers which are mono- or poly-functionalized and which apart from hydroxyl groups contain amide-, cyano-, chloro- and silane substituents.

Particularly useful reactive monomers that can be included in the composition of the present invention include (meth)acrylate monomers. The type of (meth)acrylate monomer that is used in the composition can be changed based on the desired cure properties. For example, for a faster UV or thermal cure an acrylate monomer can be used. Preferably, the acrylate monomer is selected from the group comprising trimethylolpropane triacrylate, 1-vinyl-2-pyrrolidinone, lauryl acrylate, 1,6-hexanediol diacrylate, or a combination thereof, the structures of which are reproduced below.

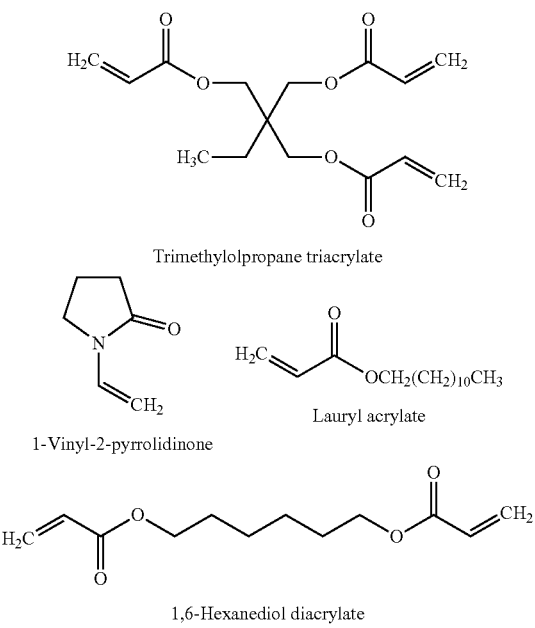

Trimethylolpropane triacrylate

1-Vinyl-2-pyrrolidinone

Lauryl acrylate 1,6-Hexanediol diacrylate

Preferably the reactive monomer has a rigid fused ring structure such as isobornyl acrylate, Tricyclo [5,2,1,0] decanedimethanol diacrylate (Trade name SR833S) and dicyclopentanyl acrylate, shown below.

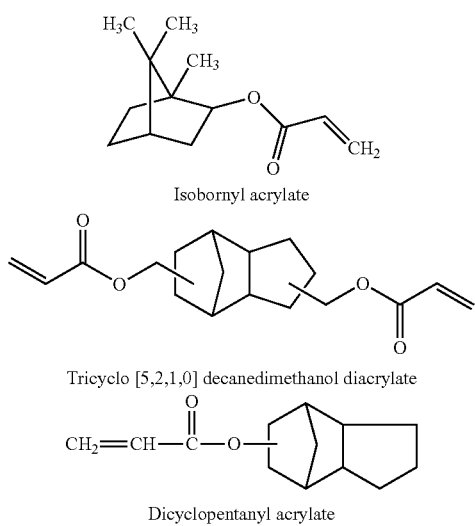

Isobornyl acrylate

Tricyclo [5,2,1,0] decanedimethanol diacrylate

Dicyclopentanyl acrylate

Initiators

Useful initiators, including but not limited to single or the mixture of the following types of chemicals: Diacryl peroxide, Dialkyl peroxydicarbonate, tert-alkyl peroxyester, di-tert-alkyl peroxide, peroxyketals, t-amyl peroxides, and azobisisobutyronitrile.

Low-Melting Metals or Alloys

The low-melting metals or alloys used herein provide conductive bridges between the silver flakes, which surprisingly improves the stretchability of the ink by maintaining conductivity when stretched. The low-melting metals or alloys themselves have low conductivity.

The low-melting metals or alloys included in the compositions disclosed herein must be dispersible in the polymer and must show an inter-metallic interaction with the conductive flake ("wetting").

The low-melting point metal or alloy that is included in the composition can be selected based on its melting temperature and the end use of the composition. Specifically, the melting temperature of the alloy is less than the temperature that the stretch process is carried out at. For example, the low melting metal or alloy has a melting point of less than about 200° C., for example about 0° C. to about 120° C., preferably about 20° C. to about 60° C.

Preferably, the low-melting metal or alloy is gallium, mercury, lead, Field's metal, Galinstan or low melting alloys of Sn, Ga, Bi, In, lead, or a combination thereof.

The low-melting metal or alloy is present in an amount of about 0.1 to about 50%, for example about 1 to about 50%, preferably about 10 to about 40% by volume of the entire composition.

Solvent

The composition can further comprise additional optional components. For example, the composition can further comprise a solvent, specifically an organic solvent. The organic solvent, when included in the compositions disclosed herein can comprise an ether or ester-based solvent, toluene, water, or other typical organic solvents or a combination thereof. The solvent should be stable at room temperature and soluble to the polymer included in the composition. Further, at the curing temperature of the ink composition, the solvent should evaporate quickly.

Other Additives

Other additives are possible in the composition. For example, a surfactant can be added to the composition to aid in dispersion of the liquid metal or alloy.

Stretchable Conductive Ink Composition

The inventive stretchable conductive inks disclosed herein yield better single and multiple stretch performance, higher conductivity after stretch, and allow for a higher amount of conductive flake loading with increased flexibility and higher elongation to electrical and mechanical failure.

Specifically, the initial resistivity of the ink compositions disclosed herein is in the range of about $1\times10^{-3}$ to about $1\times10^{-5}$ Ohm*cm. Further, the resistivity at about 100% elongation is less than about 100 Ohm*cm.

Conductivity loss is defined by an open circuit Ohmmeter when no conductivity can be measured, for example when the resistance value on the Ohmmeter exceeds $10^{+6}$ Ohms. Conductivity of the ink compositions disclosed herein is not lost until elongation reaches greater than about 50%.

EXAMPLES

The electrically conductive ink compositions were prepared in lab mixer by combining each component in the order listed in the tables below while mixing at room temperature. Control Example is an experimental conductive ink formulation that includes a polymer and conductive particles with no low melting metal or alloy. The composition of Control Example is shown in Table 1, below, wherein SF-7AT from AMES Goldsmith, Estane 5717 from Lubrizol, Butyle carbitol is from Sigma Adrich, and Dowanol PMA Glycol ether Acetate from Dow Chemical.

During the mixing process of the ink composition, low melting alloys or metals are dispersed into the Control Example. Specifically, about 3-grams of gallium was mixed with about 8-grams of the Control Example in a speed mixer. During the mixing, the sample temperature is increased to 40° C., which is above the melting temperature of gallium. Therefore, the liquid gallium drop will be distributed in the composite during the vigorous mixing process. Similarly, a low melting alloy Galinstan formulation was also made, Galinstan has a melting point of −19° C., this makes it a good fit for applications that require stretch at room temperature.

The resulting formulations are shown in Table 1.

TABLE 1

|  | Control Example | Control Example + Gallium | | Control Example + Galinstan | |
|---|---|---|---|---|---|
|  | % | Parts | % | Parts | % |
| Acrosolve PM acetate | 8.68 | 8.68 | 6.22 | 8.68 | 7.2 |
| Butylcarbitol | 26.87 | 26.87 | 19.26 | 26.87 | 22 |
| Estane 5715 | 8.89 | 8.89 | 6.37 | 8.89 | 7.4 |
| SF 7AT | 55.56 | 55.56 | 39.84 | 55.56 | 46.3 |
| Gallium |  | 37.5 | 26.88 | 20 | 17 |
| Silane |  | 2 | 1.43 |  |  |
|  | 100 | 139.5 | 100 | 120 | 100 |

These compositions were then tested for stretchable conductivity according to the following procedure: 15 μm thick, 3 mm wide dumbbell shaped film specimen was obtained by stencil printing the specimen followed by removal of solvent for about 20 minutes at about 120° C. The electrical properties during stretching were evaluated on an unsupported film at about 5 mm/minute, with elongation and resistance measured simultaneously.

FIG. 1 depicts a graph of resistance versus elongation for three tests: Control Example, Control Example+Gallium when stretched at room temperature, and Control Example+Gallium when stretched at 40° C., which is above the gallium melting point of about 30° C. For the latter, a heat lamp (SATCO 250W 120V Type R lamp) is used to heat the sample's temperature to above about 40° C. to ensure the Gallium has completely melted and is in liquid state. When the experimental temperature is below the melting point of the Gallium, such as at room temperature, the Gallium in the sample is in a solid state. The data depicted in FIG. 1 indicates that including solid Gallium in the Control Example below the melting point of gallium (about 30° C.) is not effective in improving the stretchability of the composition. When stretched at 40° C. the sample showed remarkable improvement in stretchability while still maintaining conductivity. These results demonstrate that the liquid Gallium is very helpful in maintain low resistance during stretch.

The compositions including liquid gallium showed no agglomeration of liquid metal after cooling to room temperature.

Figure 2:
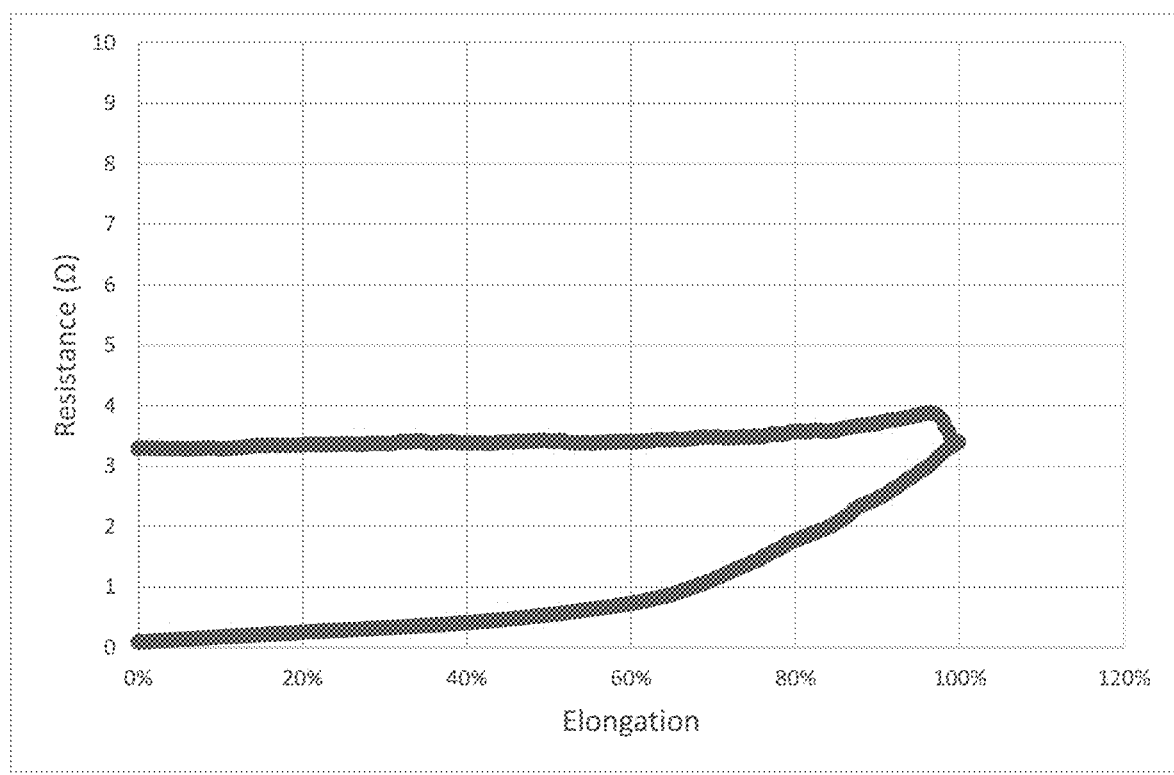
FIG. 2 depicts a plot of resistance (Ohm) versus elongation percentage for Control example A including gallium single cycle with a heat lamp.

FIG. 2 depicts a graph of resistance versus elongation for Control Example and Control Example+Gallium after stretching at 40° C. (stretch sample from 0 to 100% elongation and back to 0%).

Figure 3:
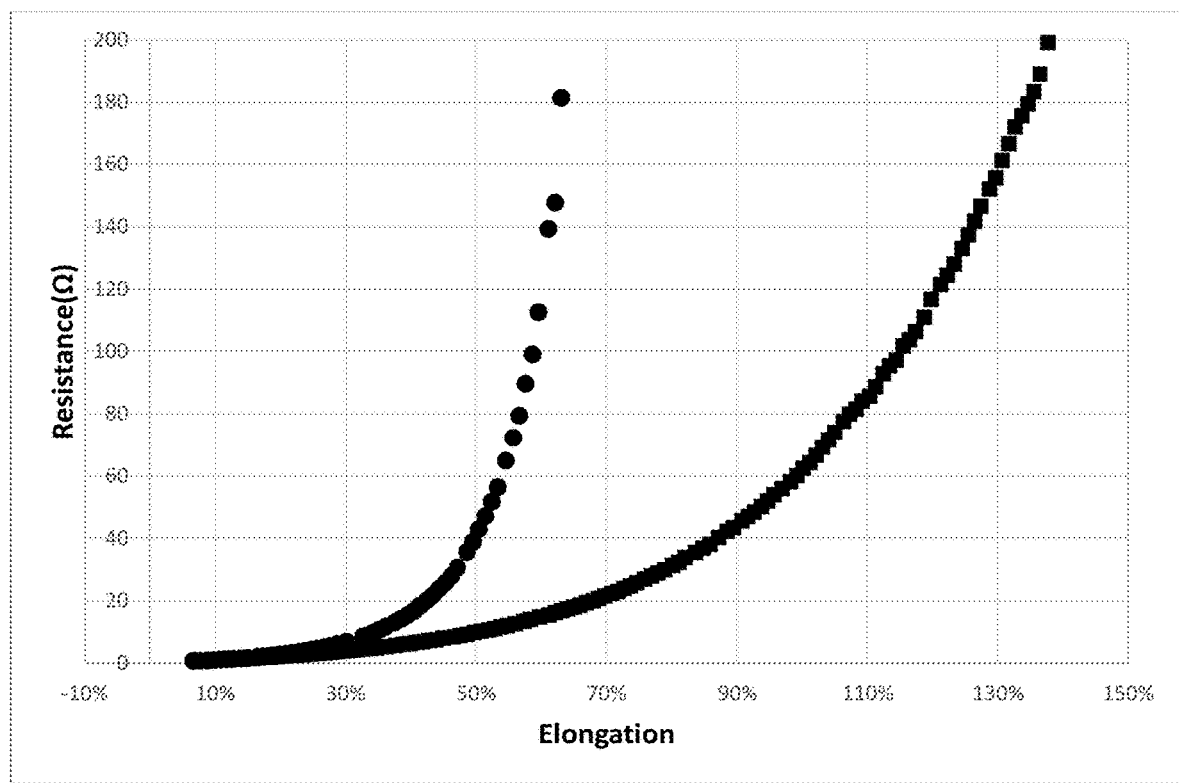
FIG. 3 depicts a plot of resistance (Ohm) versus elongation percentage for Control example A including solid gallium at about 23° C.

FIG. 3 depicts a graph of resistance versus elongation for Control Example with added Galinstan, the sample was tested at room temperature, as Galinstan has a melting point of −19° C., Galinstan remained in a liquid state during the room temperature stretch. As compared to the Control Example, the sample with added Galinstan showed much lower resistance during stretch.

FIGS. 1-3 demonstrate that stable dispersions with gallium or Galinstan could be dispersed when the metal is in the molten state. Further, these results demonstrate that the incorporation of liquid gallium or Galinstan in the conductive ink composition prevents an increase in resistivity, i.e. retains conductivity, when the ink composition is stretched.

The invention claimed is:

1. A stretchable conductive ink composition comprising:
a binder;
conductive particles, which are a mixture of flakes and beads; and
a low-melting metal or alloy;
wherein the binder is a polymer, a reactive monomer with initiator, an oligomer, or a combination thereof;
wherein initial resistivity is measured before elongation,
wherein the resistivity of the stretchable conductive ink composition is less than 10 times the initial resistivity at 50% elongation, and
wherein the low melting metal or alloy is present in an amount of about 10 to about 40% by volume of the entire composition.

2. The stretchable conductive ink composition of claim 1, wherein the monomer or oligomer is polymerized when the composition is cured.

3. The stretchable conductive ink composition of claim 1, wherein the polymer is thermoplastic polyurethane.

4. The stretchable conductive ink composition of claim 1, wherein conductive particle is silver, aluminum, copper, nickel, carbon, graphite flake.

5. The stretchable conductive ink composition of claim 1, wherein conductive particle is present in an amount of about 20 to about 90% by volume of the entire composition.

6. The stretchable conductive ink composition of claim 1, wherein the metal or alloy is gallium, Field's metal, Galinstan or low melting alloys of Sn, Ga, Bi, In, or a combination thereof.

7. The stretchable conductive ink composition of claim 1, wherein low melting metal or alloy has a melting point of less than about 200° C.

8. The stretchable conductive ink composition of claim 1, wherein the beads are silver beads.

9. The stretchable conductive ink composition of claim 1 further comprising a solvent.

10. The stretchable conductive ink composition of claim 1, wherein the metal or alloy comprises gallium or Galinstan.

11. The stretchable conductive ink composition of claim 1, wherein the conductive flake is less than 10 μm.

12. The stretchable conductive ink composition of claim 1, wherein the conductive flake is silver flake.

13. The stretchable conductive ink composition of claim 1, wherein the initial resistivity is in the range of about $1 \times 10^{-3}$ to about $1 \times 10^{-5}$ Ohm*cm.

14. The stretchable conductive ink composition of claim 1, wherein the resistivity at about 100% elongation is less than about 100 Ohm*cm.

15. The stretchable conductive ink composition of claim 1, further comprising an organic solvent.

16. The stretchable conductive ink composition of claim 1, further comprising a silane.

17. An application device including the stretchable conductive ink composition of claim 1.

18. The application device of claim 17, which is a panel for appliance, dashboard and button for automotive or aerospace device, interface for industry control device, textile application device and/or wearable medical device.

* * * * *